United States Patent [19]
Kotani et al.

[11] Patent Number: 5,642,409
[45] Date of Patent: Jun. 24, 1997

[54] FACSIMILE APPARATUS

[75] Inventors: Matahira Kotani, Ikoma-gun; Motohiko Hayashi, Yamatokoriyama; Masayuki Hachinoda, Nara, all of Japan

[73] Assignee: Sharp Kabushiki Kaisha, Osaka, Japan

[21] Appl. No.: 132,271

[22] Filed: Oct. 6, 1993

[30] Foreign Application Priority Data

Oct. 30, 1992 [JP] Japan .................................. 4-293187

[51] Int. Cl.$^6$ .................................................. H04M 11/00
[52] U.S. Cl. ................................................ 379/100; 358/442
[58] Field of Search .............................. 379/100, 94, 97, 379/98, 102, 104, 105, 93; 358/442

[56] References Cited

U.S. PATENT DOCUMENTS

| | | | |
|---|---|---|---|
| 5,014,296 | 5/1991 | Saigano | 379/67 |
| 5,036,534 | 7/1991 | Gural | 379/67 |
| 5,048,076 | 9/1991 | Maurer | 379/94 |
| 5,086,455 | 2/1992 | Satomi | 379/100 |
| 5,146,489 | 9/1992 | Telibasa | 379/102 |
| 5,151,972 | 9/1992 | Lorenz | 379/93 |
| 5,267,302 | 11/1993 | Kotani | 379/100 |
| 5,293,575 | 3/1994 | Hirai | 379/100 |
| 5,471,522 | 11/1995 | Sells et al. | 379/97 |

FOREIGN PATENT DOCUMENTS 2-207653   8/1990   Japan .

Primary Examiner—Stella Woo
Attorney, Agent, or Firm—Nixon & Vanderhye

[57] ABSTRACT

A communications system connected to a telephone network includes a facsimile machine and a telephone set. The telephone set includes a telephone for conducting voice communications over the telephone network and a telephone answering machine for automatically responding to calls received by the telephone set over the telephone network. One or more operational parameters of the answering machine are set to define how it automatically responds to calls. A switch connects either the facsimile machine or the telephone set to a telephone network. One or more operational parameters of the answering machine is initially detected and stored. A controller controls the switch to connect either the facsimile machine or the telephone set to a telephone network based on a comparison of the stored parameter(s) and subsequently detected operational parameter(s) detected when the answering machine responds to a call.

9 Claims, 9 Drawing Sheets

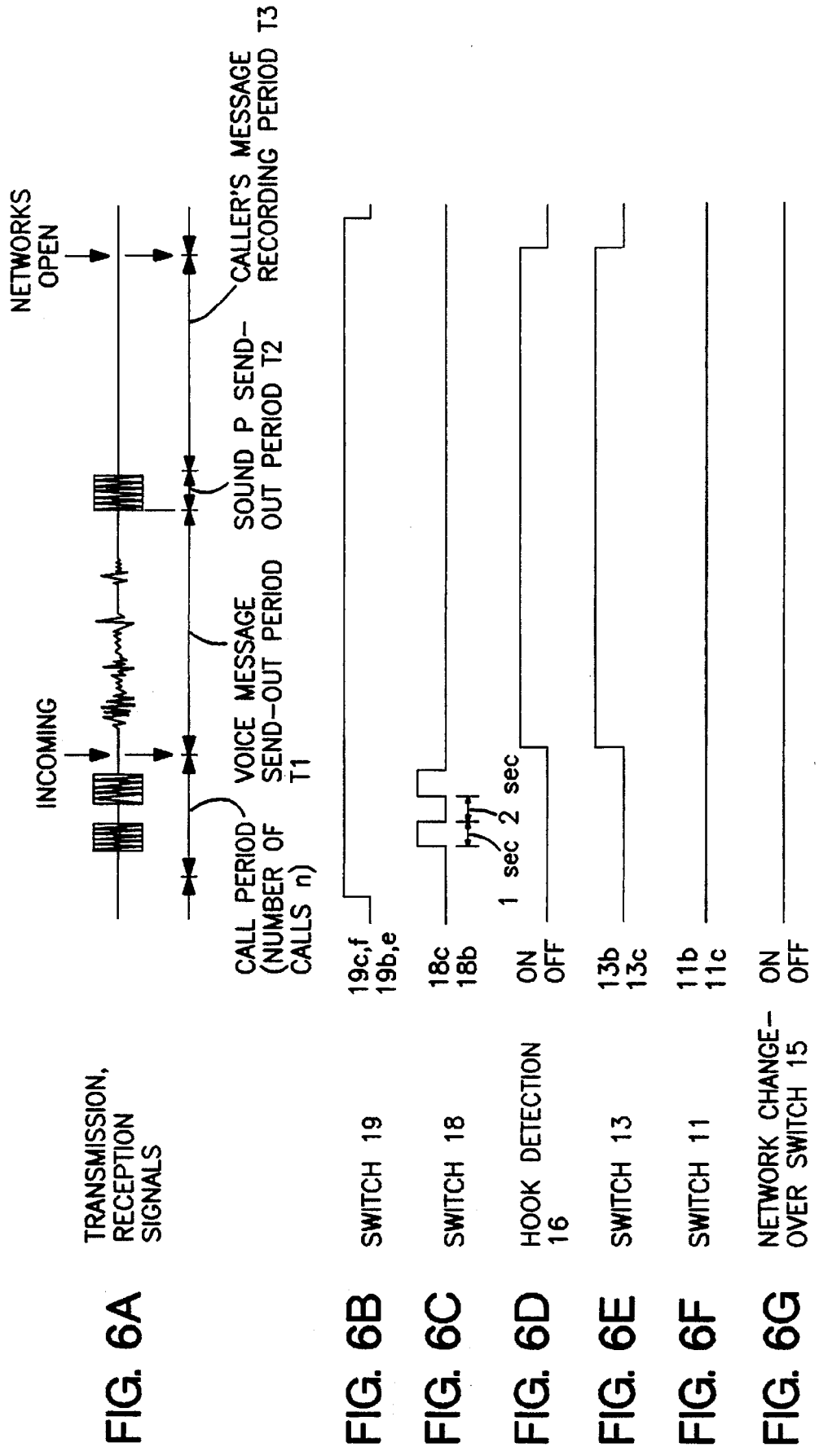

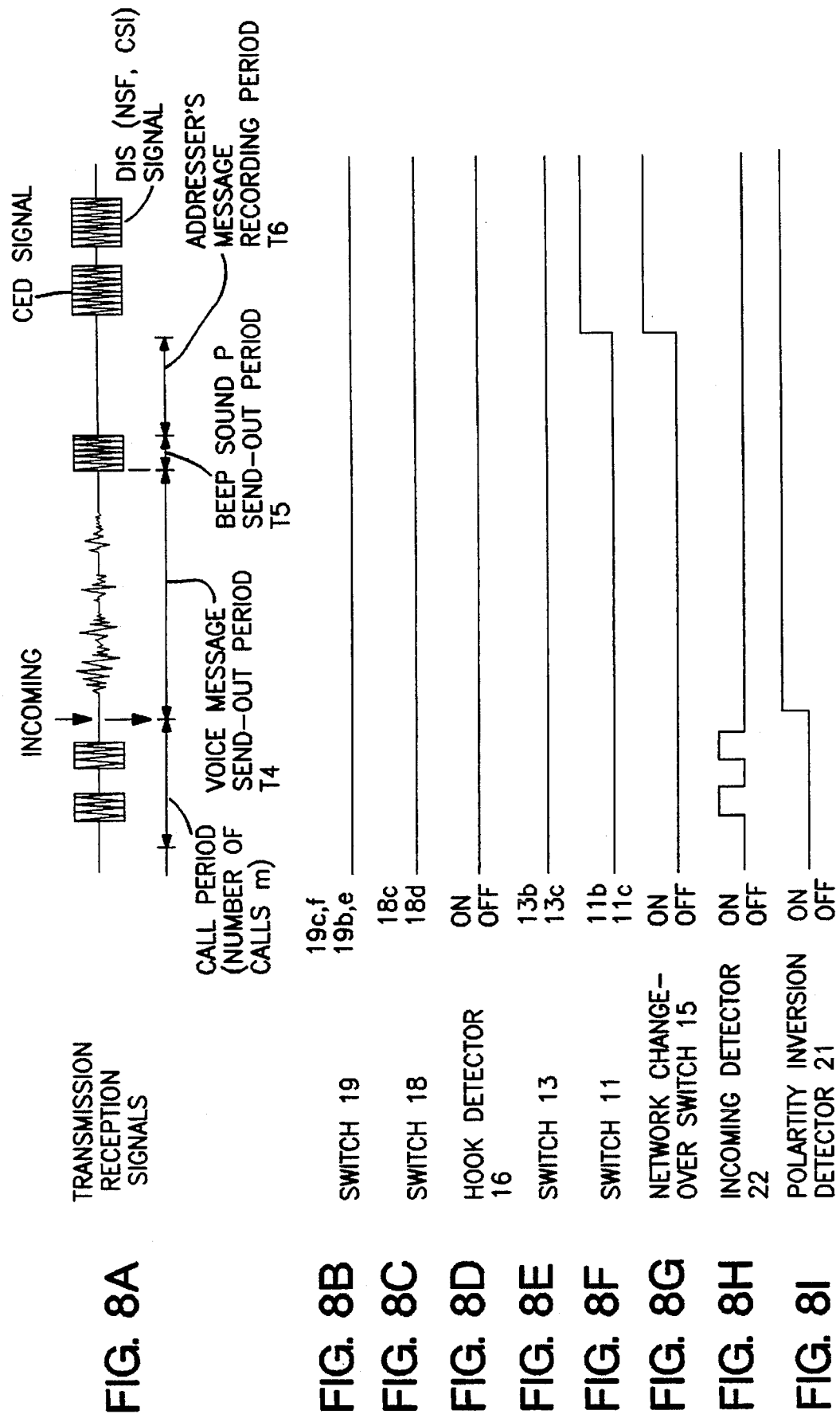

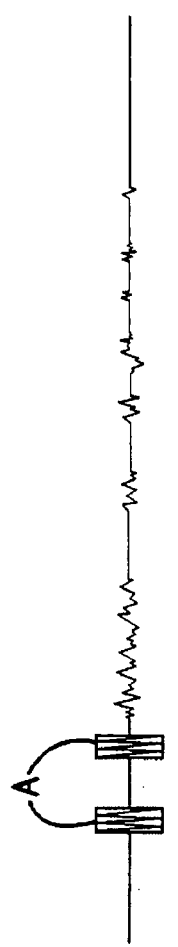
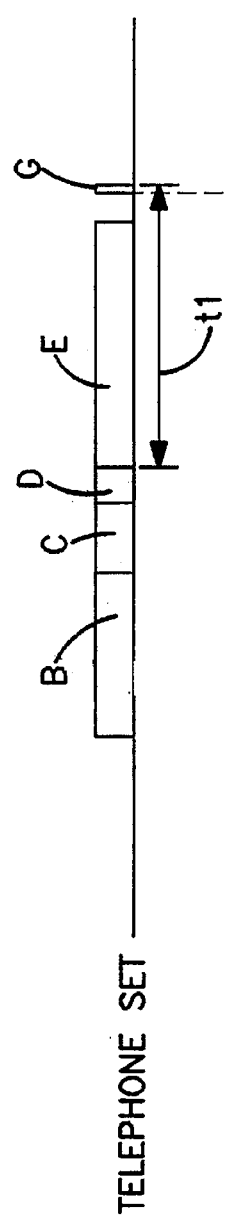
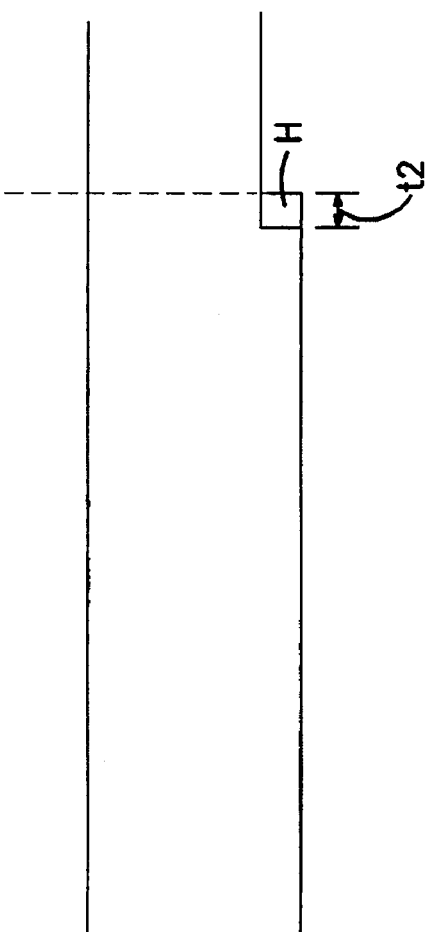
FIG. 9A PRIOR ART
FIG. 9B PRIOR ART
FIG. 9C PRIOR ART
FIG. 9D PRIOR ART

FACSIMILE APPARATUS

BACKGROUND OF THE INVENTION

1. Field of the Invention

The present invention relates to a facsimile apparatus for communicating information by over public telephone networks.

2. Description of the Related Art

While some facsimile apparatus incorporate multiple telephone functions, others do not. When a telephone function is not incorporated, an external telephone set is often connected to an extension telephone terminal (modular jack) provided in the facsimile apparatus. The external telephone set many include various functions such as, for example, an automatic telephone answering function for automatically responding to a call transmitted over the network if the callee is absent, and storing the voice message of the caller.

A facsimile apparatus having such an external telephone terminal generally operates in three reception modes; a manual reception mode, an automatic reception mode, and an answering telephone connection mode. The user selects the mode. In the manual reception mode, the user lifts the handset of an internal or external telephone set, responds to the call, and manually changes to the facsimile reception, e.g. by pressing a start button or the facsimile machine. In the automatic reception mode, after the apparatus automatically reacts to the call, a determination is made whether the call is a facsimile reception or a voice message, the communication is connected to the appropriate receiving unit.

In the answering telephone connection mode, the connected telephone set executes an automatic telephone answering function and judges if a predetermined condition has occurred, the connection of the public telephone line is automatically changed to the facsimile apparatus after the automatic telephone answering function is completed. The predetermined condition may correspond to the absence of a caller's voice message to be recorded after the answering machine has generated a prompt to leave a message "after the beep," i.e., a no-signal state for a specific period.

FIG. 9 is a timing chart showing the operation of a conventional facsimile apparatus combined with a telephone set with automatic telephone answering function as mentioned above. An incoming signal A (i.e., a ring signal) shown in FIG. 9 (1) is received through the public telephone network, and when the incoming signal A is received a predetermined number of times, i.e., a predetermined number of rings, for example, two times as shown in FIG. 9 (1), the automatic telephone answering function of the connected telephone set is activated as shown in FIG. 9 (2), a voice amendment message B is sent out. The voice message B says, for example, "I'm away from home now. Leave your message after the beep sound." After a specific no-signal period, a dial tone D or beep indicating the start of recording is generated, and the caller's message E is recorded for a predetermined time t1, for example, 30 seconds or a minute. When recording for the time t1, a dial tone G or beep indicating the end of recording is generated.

When the facsimile apparatus is set in the manual reception mode as shown in FIG. 9 (3), whether during or after operation of the automatic telephone answering function, the public telephone network remains connected to the telephone set. Or, as shown in FIG. 9 (4), when the telephone set is in the answering telephone connection mode, by detecting the state H in which the signal level is −48 dBm or less for a predetermined no-signal period t2 during operation of the automatic telephone answering function, the connection of the public telephone circuit is automatically changed over to the facsimile apparatus.

A problem arises when the facsimile apparatus is in the manual reception mode, and the public telephone circuit remains connected to the telephone set rather than being changed over to the facsimile apparatus automatically. Using only a single telephone line it is impossible to operate both the facsimile reception and the automatic telephone answering function by the telephone set at the same time. In a facsimile apparatus conforming to the recommendation of the CCITT (International Telegraph and Telephone Consultative Commitee), a CNG control signal transmitted from the facsimile apparatus of the caller, solves this problem by automatically connecting the public telephone network to the receiving facsimile apparatus when receiving the CNG signal. But there are many facsimile apparatus not capable of transmitting the CNG signal. In addition, if the automatic telephone answering function of the telephone set is deactivated when the facsimile apparatus detects the state H corresponding to the no-signal period while the telephone set is actually in service, the public telephone network is automatically changed over to the facsimile apparatus, and the service is interrupted.

SUMMARY OF THE INVENTION

It is a primary object of the invention to present a facsimile apparatus capable of recognizing the operating state of a connected telephone set and changing over the connection of the public telephone network between the facsimile machine and telephone set automatically and smoothly.

To achieve the above object, a facsimile apparatus provided with a telephone set (internally or externally) with an automatic responding function for executing a predetermined responding action automatically in response to a call from the caller to where the connection of the public network is switched between the telephone set or facsimile machine. The facsimile apparatus includes:

means for activating the automatic responding function, means for detecting an action parameter for specifying the predetermined responding action, means for storing the action parameter, and means for controlling changeover by detecting the responding action of the telephone set to compare with the memory content in the storing means, and changing the connection of the public networks to the facsimile communication means at the end of the responding action when it is judged that the automatic responding function is executed.

According to the invention, the facsimile apparatus selectively changes over the telephone set or facsimile communication means connected to public networks. The telephone set is furnished with an automatic responding function known as an automatic answering telephone function for executing a predetermined responding action automatically in response to a call from the caller.

The automatic responding function of the telephone set is activated by the indicating means of the facsimile apparatus connected thereto, and executes the responding action. The automatic responding function includes an action parameter for specifying a predetermined responding action. This action parameter is detected by the detecting means of the facsimile apparatus, and stored in the storing means.

The facsimile apparatus detects the responding action of the telephone set, compares with the memory content stored in the storing means, and judges if the telephone set is executing the automatic responding function or not. When the automatic responding function is executed, the connection of the public network is changed over to the facsimile machine by the changeover control means after the responding action.

Therefore, it is possible to prevent interruption of service as the public networks are changed over to the facsimile communication means except when necessary, for example, while talking on the telephone set. In the manual reception mode, too, after the responding action, the public network is changed over to the facsimile communication means. In this way the facsimile reception and service of telephone set are effectively realized at the same time. Furthermore, by eliminating the answering telephone connection mode of the facsimile apparatus, changing between modes is simplified and control is enhanced.

Thus, according to the invention, an action parameter relating to the automatic responding function of the telephone set connected to the facsimile apparatus is detected and stored. Furthermore, when the telephone set responds, the responding action is compared to what is stored in memory to judge whether the automatic responding function is actuated or not. The connection of the public telephone network is changed over to the facsimile communication means at the end of the responding action when executed. Therefore, the connection of the public network connected to the facsimile apparatus or telephone set can be changed over automatically and smoothly, and trouble during setting of answering telephone connection mode or manual reception mode of the facsimile apparatus can be prevented.

In the invention, the indicating means includes means for generating a dummy ringer voltage corresponding to a ringer voltage entered through the public network.

In the invention, moreover, the action parameter may comprise one ore more of:

(a) the number of inputs of ringer voltage entered until the predetermined responding action is started, (b) the send-out period of voice message being sent out from the start of the predetermined responding action, (c) the frequency of a beep sound being sent out after the voice message is sent out, (d) the send-out period of the beep sound, and (e) the recording time preserved for recording the caller's message after sending out the beep sound. The detecting means may comprise a hook detecting means for detecting whether the hook switch of the telephone set is on or off, and a counter for counting the number of inputs of dummy ringer voltage entered until the hook detecting means detects that the hook switch is in ON state. Alternatively, the detecting means may comprise means for detecting send-out of a beep sound, and a timer for measuring the time from the moment of detection of the ON state of the hook switch by the hook detecting means until the moment of detection of send-out of beep sound by the beep sound detecting means.

The beep sound detecting means may comprise means for detecting the frequency of beep sound, and a timer for measuring the send-out period of the beep sound. The detecting means may further alternatively comprise a timer for measuring the time from the moment of detection of end of send-out of the beep sound by the beep sound detecting means until the moment of detection of the OFF state of the hook switch by the hook detecting means.

The frequency detecting means may comprise plural programmable filters capable of varying the frequency band to be detected.

BRIEF DESCRIPTION OF THE DRAWINGS

Other and further objects, features, and advantages of the invention will be more explicit from the following detailed description taken with reference to the drawings wherein:

FIGS. 6 (A) to (G) are timing charts showing the action in the register mode in the facsimile apparatus 1;

FIGS. 8 (A) to (I) are timing charts showing the action of the facsimile apparatus 1 when called; and FIGS. 9 (A) to (D) are timing charts showing the action of a conventional facsimile apparatus when called.

DETAILED DESCRIPTION OF THE PREFERRED EMBODIMENT

Figure 1:
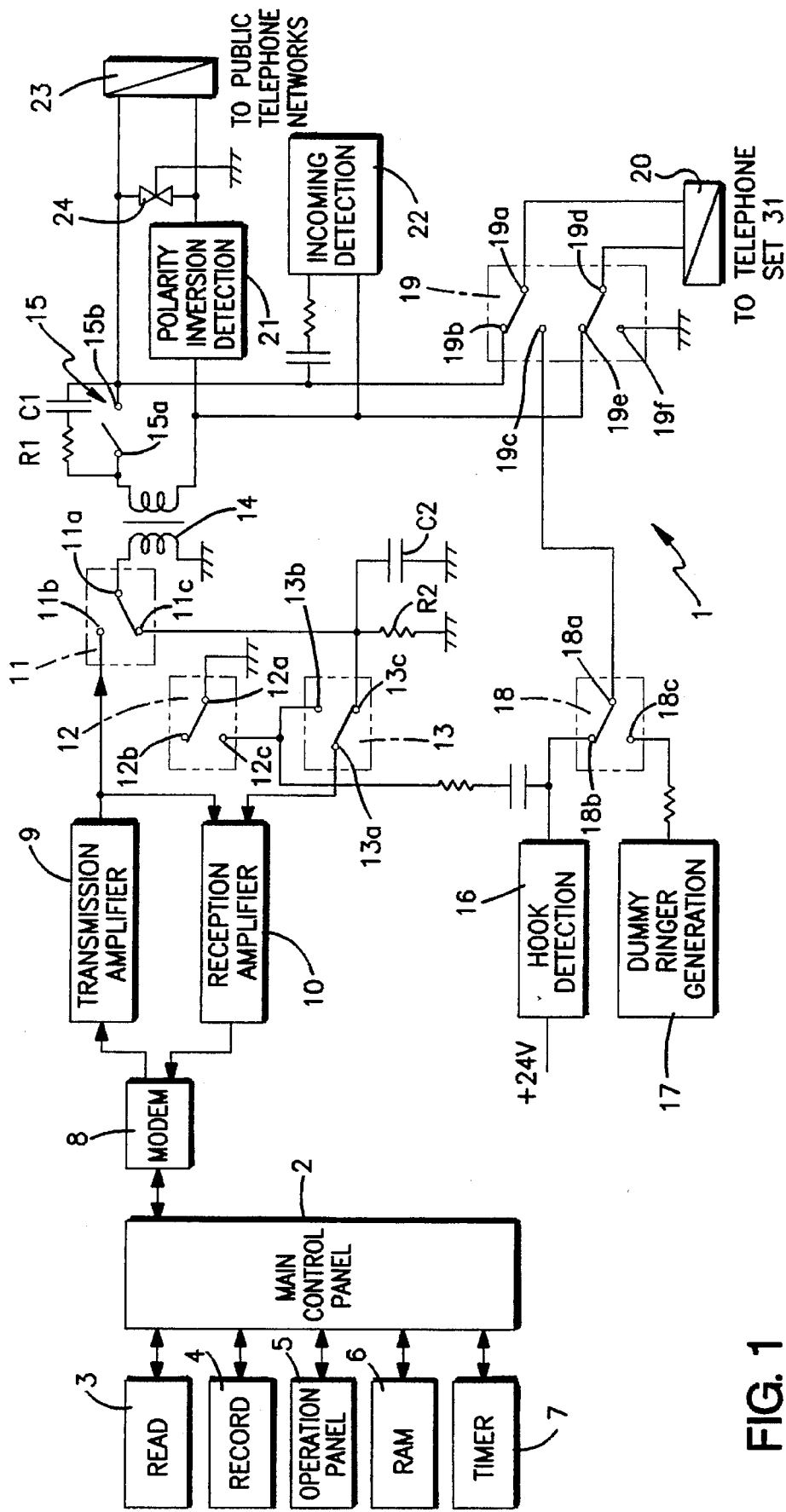
FIG. 1 is a block diagram showing a schematic constitution of a facsimile apparatus 1 in an embodiment of the invention.

Now referring to the drawings, preferred embodiments of the invention are described below.

FIG. 1 is a block diagram showing an electric configuration of a facsimile apparatus 1 in one embodiment of the invention. In the facsimile apparatus 1 of the embodiment, the conventional telephone answering connection mode is eliminated so that reception modes comprise a manual reception mode, a telephone/facsimile select mode, and a facsimile reception mode.

The facsimile apparatus 1 comprises a main control unit 2 which is responsible for control of the entire apparatus, a reading unit 3, a recording unit 4, an operation panel 5, a RAM (random access memory) 6, a timer 7, and a modem 8 are connected to the main control unit 2. The reading unit 3 may be, for example, a CCD (charge coupled device) sensor, and reads the document to be transmitted. The recording unit 4, containing a thermal head, for example, reproduces the received data as an image output on recording paper not shown herein. The operation panel 5 includes plural keys for inputting various instructions such as input of the destination telephone number and command of the facsimile apparatus.

Figure 2:
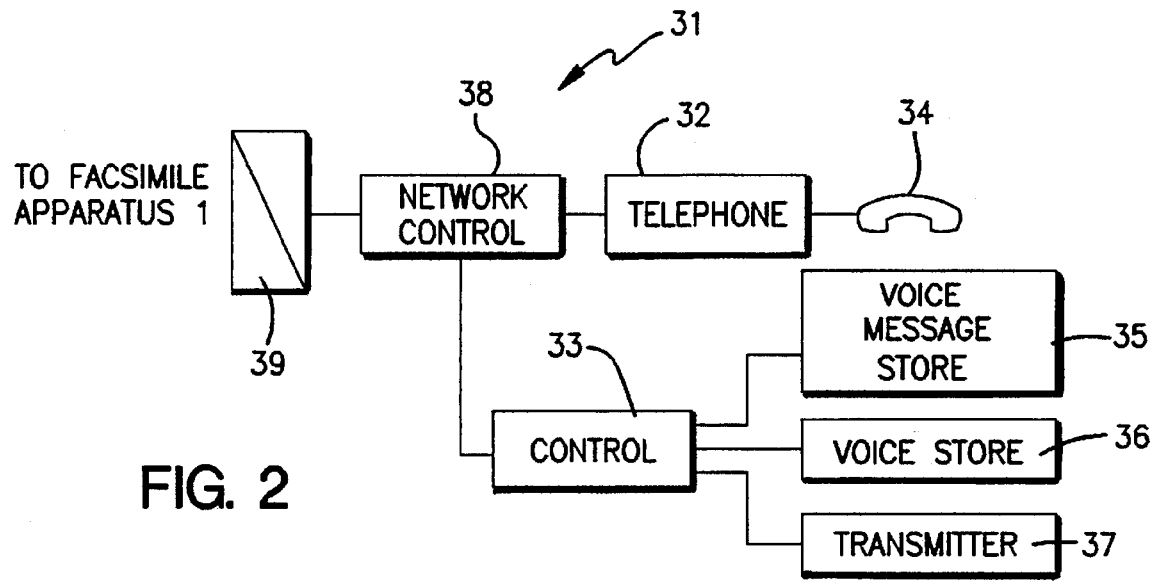
FIG. 2 is a block diagram showing a schematic constitution of an external telephone set 31 connected to the facsimile apparatus 1.

The RAM 6 stores various conditions/parameters of the automatic answering telephone function provided along with telephone set 31 shown in detail in FIG. 2. The timer 7 detects the actual condition of the automatic answering telephone function, the activation period during action of this function, and other parameters. As described below, filters F1, F2, F3 built in the modem 8 permits detection of the frequency FP of the beep sound P sent out from a transmitter 37 of the answering function of the telephone set 31.

A transmission amplifier 9 and a reception amplifier 10 are connected to a connection jack 23 connected to public telephone network circuits through a transformer 14 and a circuit changeover switch 15. The transmission amplifier 9, reception amplifier 10 and transformer 14 are connected through switches 11, 12, 13. The switches 11, 12, 13 are switches for changing over the signal sent out from the telephone set 31 connected through the connection jack 20 to be entered into the main control unit 2, and they execute the actions individually as described later. The circuit changeover switch 15 is a switch for closing the direct-current circuit between the public telephone circuits and the modem 8 for transmitting and receiving the facsimile or the external telephone set 31. Resistance R1 and capacitor C1 only permit transmission of the alternating-current component of the signal on the public telephone circuits in the open state of the switch 15 to the transformer 14, and further transmitting to the modem 8.

The switch 11 connects the public telephone circuits and modem 8, when the direct-current circuit is closed, through the transformer 14. The switch 12 prevents undesired noise signal produced from the telephone set 31 from being transmitted to the modem 8 during service of the telephone set 31 connected to the connection jack 20. The switch 13 connects public telephone circuits and modem 8, or to connect the telephone set 31 and modem 8, when the direct-current circuit is open. Between the switch 11 and switch 13, resistance R2 and capacitor C2 determine the connection impedance to the public telephone circuits in the open state of the switch 15 and to adjust the level and frequency characteristic of the signal sent from the resistance R1 or capacitor C1 provided in the switch 15. Therefore, the switches 11 to 13 are connected as shown in Table 1 below.

TABLE 1

| State | Switch 11 | Switch 12 | Switch 13 | Connection state |
|---|---|---|---|---|
| Waiting | c | b | c | Connection of public telephone circuit and modem 8 in DC circuit open state |
| Communicating | b | c | c | Connection of public telephone circuit and modem 8 in DC circuit closed state |
| Detection Registration | c | b | b | Connection of telephone set 31 and modem 8 |

A hook detector 16 detects the state of the hook switch of the telephone set 31, and delivers the detection signal to the main control unit 2. A dummy ringer generator 17 generates a dummy ringer voltage corresponding to the ringer voltage entered from the public telephone circuits. The hook detector 16 and dummy ringer generator 17 are connected to the connection jack 20 to which the telephone set 31 is connected through a switch 18. The switch 18 connects the telephone set 31 to the hook detector 16 or dummy ringer generator 17. The switch 18 and connection jack 20 are connected through a switch 19. The switch 19 connects the telephone set 31 via the connection jack 20 to the public telephone circuit or to the facsimile apparatus 1.

A polarity inversion detector 21 monitors the direction of the current flowing in the public telephone circuits to detect the polarity inversion of the direction of flow of the current when outgoing or when incoming as well as the state of the hook switch of the telephone set 31. Between the polarity inversion detector 21 and connection jack 23, there is an arrester 24 for protecting the facsimile apparatus 1 by absorbing voltage surges or the like that may be generated on the public telephone circuits. The incoming detector 22 detects whether a call is incoming or not by responding to the call signal from the caller (exchange).

FIG. 2 is a block diagram showing an electric configuration of the telephone set 31 connected to the facsimile apparatus 1. The telephone set 31 possesses the so-called automatic answering telephone function, and is furnished with a telephone unit 32 and a control circuit 33. The telephone unit 32 comprises, among others, a dialer for converting the telephone number entered by the user into pulse signals or tone signals and sending them out to the public telephone circuits, and transmission and reception amplifiers of voice signals. A handset 34 for communicating is also connected to the telephone unit 32.

The control circuit 33 is a circuit for controlling the automatic telephone answering function a voice message store unit 35, a voice store unit 36, and a transmitter 37. The voice message store unit 35 is for example, a RAM. A stored voice message states, for example, "I'm away from home now. Leave your message after the beep sound." The voice store unit 36 is for example, a magnetic recording and reproducing apparatus, where the received caller's message is recorded and reproduced. The transmitter 37 sends out a beep sound P to begin storing a received voice message in voice store unit 36 after the voice message announcement is over.

The telephone unit 32 and control circuit 33 are connected to a connection jack 39 through a network control circuit 38. The network control circuit 38 control operation of the handset 34 through the telephone unit 32 or execution of the automatic telephone answering function. The connection jack 39 is connected to the connection jack 20 of the facsimile apparatus 1.

Figure 3:
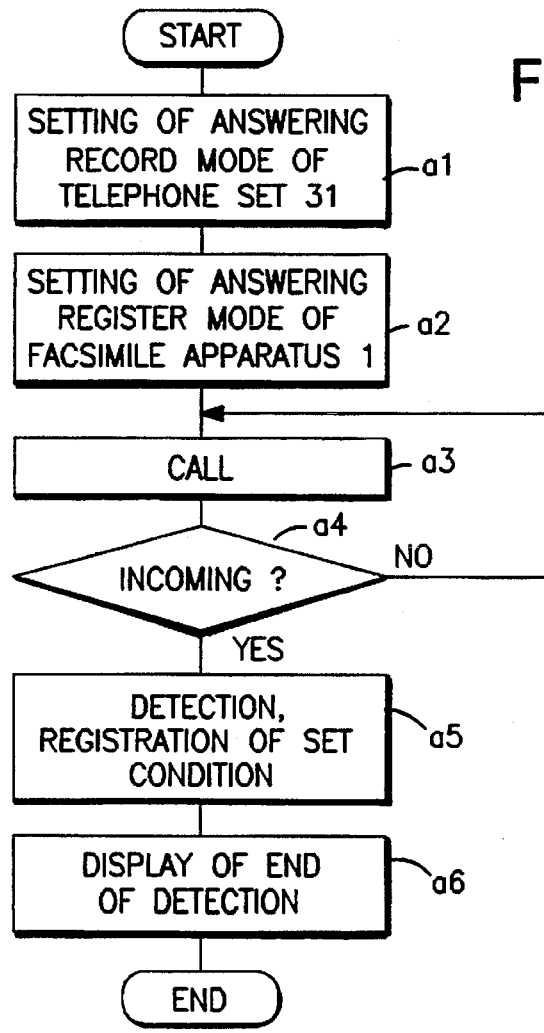
FIG. 3 is a flow chart schematically showing the detecting action of an action parameter of the external telephone set 31 in the facsimile apparatus 1.

FIG. 3 is a flow chart schematically showing the detection and registration action of parameters of the automatic telephone answering function of the telephone set 31. At step a1, an answering record mode of the telephone set 31 is set by the user. By this setting, as the action parameter, the number n of received ring signals until the voice message is sent out, the send-out period T1 of voice message, and recording time T3 of addresser's message are determined.

At step a2, a register mode of the facsimile apparatus 1 is specified from the operation panel 5 of the facsimile apparatus 1. When the register mode is specified, the main control unit 2 connects the terminal 19a and terminal 19c of the switch 19, and terminal 19d and terminal 19f, respectively.

At step a3, the telephone set 31 is called. Calling of the telephone set 31 is executed by applying a dummy ringer voltage generated in the dummy ringer generator 17 to the telephone set 31. When this voltage is applied, the terminal 18a and terminal 18c of the switch 18 are connected, but while voltage is not applied, the terminal 18a and terminal 18b are connected, and the state of the hook switch of the telephone set 31 is monitored by the hook detector 16. Calling of the telephone set 31 is executed by a present number n of rings. This number is counted by a counter in the main control unit 2.

At step a4, it is judged if the telephone set 31 has responded to the call or not. This judgement is executed by detecting the ON state of the hook switch of the telephone set S1 by the hook detector 16. When incoming, the operation advances to step a5, otherwise returning to step a3.

At step a5, detection and registration of action parameters of the automatic answering telephone function of the telephone set 31 are executed. This action is executed in the conditions of (a) the number n of rings up to send-out of the voice message, (b) send-out period T1 corresponding to voice message, and (c) frequency FP and send-out period T2 of beep sound P. These detection data are stored in the RAM 6. When the detection and registration action is over, advancing to step a6, the end of registration is displayed.

As for condition (a), on the basis of the detection signal from the hook detector 16 at step a4, the main control unit 2 stores the number n of rings until the detection signal is received, in the RAM 6. Conditions (b) and (c) are executed as follows.

As for (b), the timer 7 is started by the timing of receiving the detection signal from the hook detector 16, and the send-out period T1 of the voice message is measured. At the same time, (c) the frequency FP and send-out period T2 of the beep sound P are detected.

The frequency FP is detected by the modem 8, and a facsimile modem for G3 is, for example, executed by using a built-in programmable filter F. The band width fs of the filter F is set as (FPmax−FPmin)/x=fs, supposing the range of the detection frequency FP within FPmin≦FP≦FPmax. Herein, FPmin expresses the minimum value of detection frequency, and FPmax is the maximum value of detection frequency. Meanwhile, x denotes the number of divisions of the frequency band divided for the purpose of detection. Besides, supposing the number y of filters F detected simultaneously by the modem 8, the division number x is expressed as x=a·y−b. Here, y is defined as y>b. Therefore, by repeating the detection action a times, detection of beep sound P in one unit of band width fs of filter F is executed.

For example, provided FPmax=2100 Hz, FPmin=900 Hz, x=6, y=3, the band width fs of filter F is fs=200 Hz (=(2100−900)/6), so that a=2. Therefore, by executing the detection action twice, detection of frequency FP can be executed in one unit of 200 Hz in a range of 2100 Hz to 900 Hz.

Figure 4A:
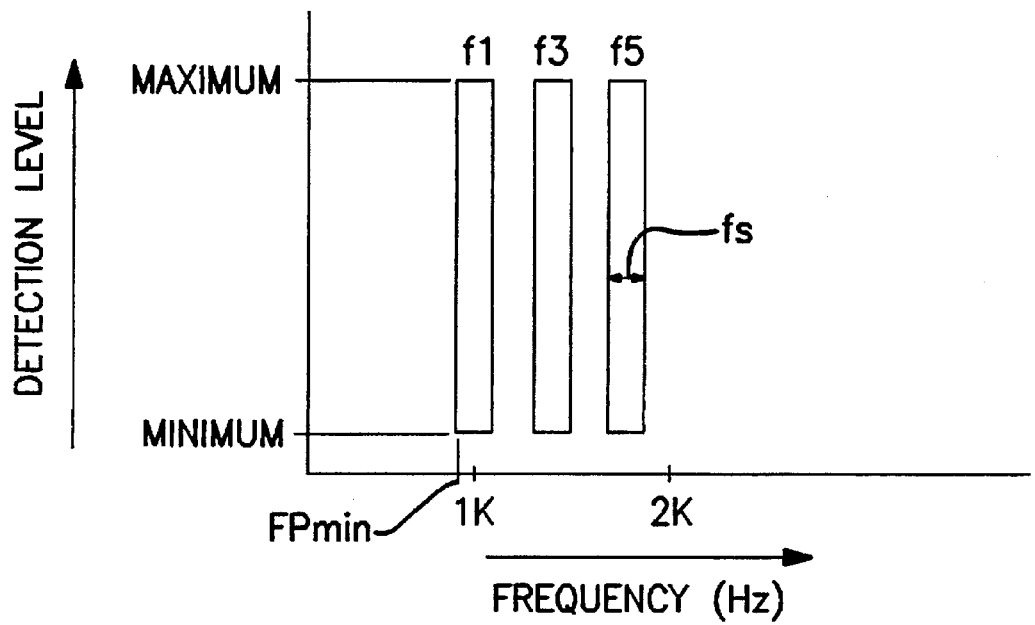
FIGS. 4 (A), (B) are diagrams for explaining the function of a modem 8 in the detecting action shown in FIG. 3.
Figure 4B:
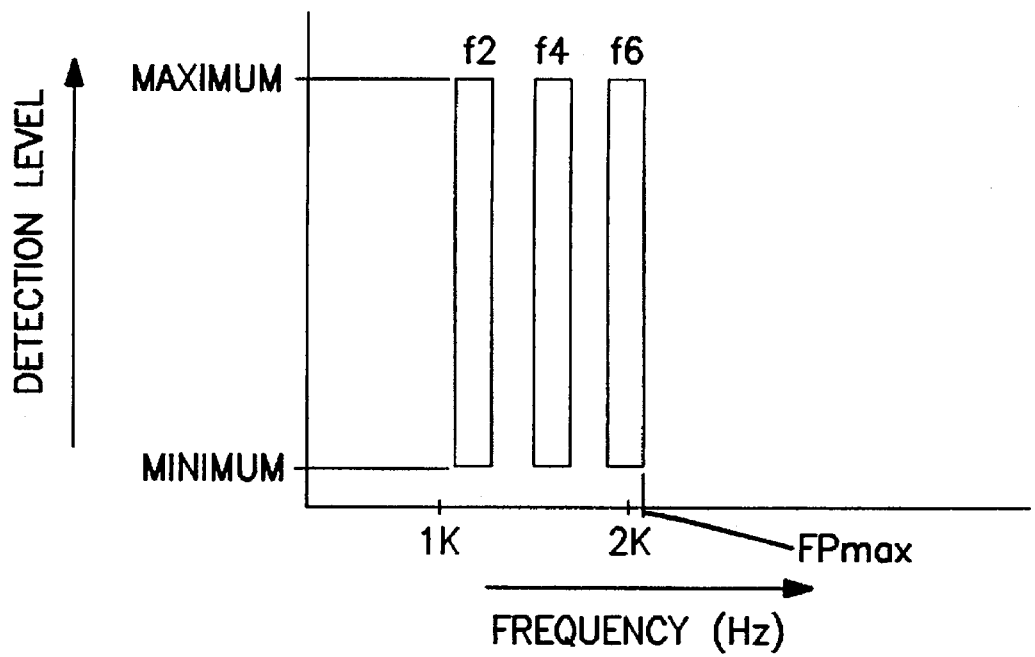

As shown in FIG. 4, by the first detection action, bands f1, f3, f5 are set in filters F1, F2, F3 of the modem 8, and by the second detection action, bands f2, f4, f6 are set in the filters F1, F2, F3 of the modem 8, respectively. The first and detection actions are divided into the bands f1, f3, f5, and the bands f2, f4, f6, which is intended to prevent simultaneous detection by two filters if there is the frequency FP to be detected in the boundary of the filter detection bands. Moreover, by varying the division number x, the range of band width fs of the filter F can be changed.

On the other hand, the send-out period T2 is measured by starting the timer 7 after the send-out period of the response message.

Figure 5:
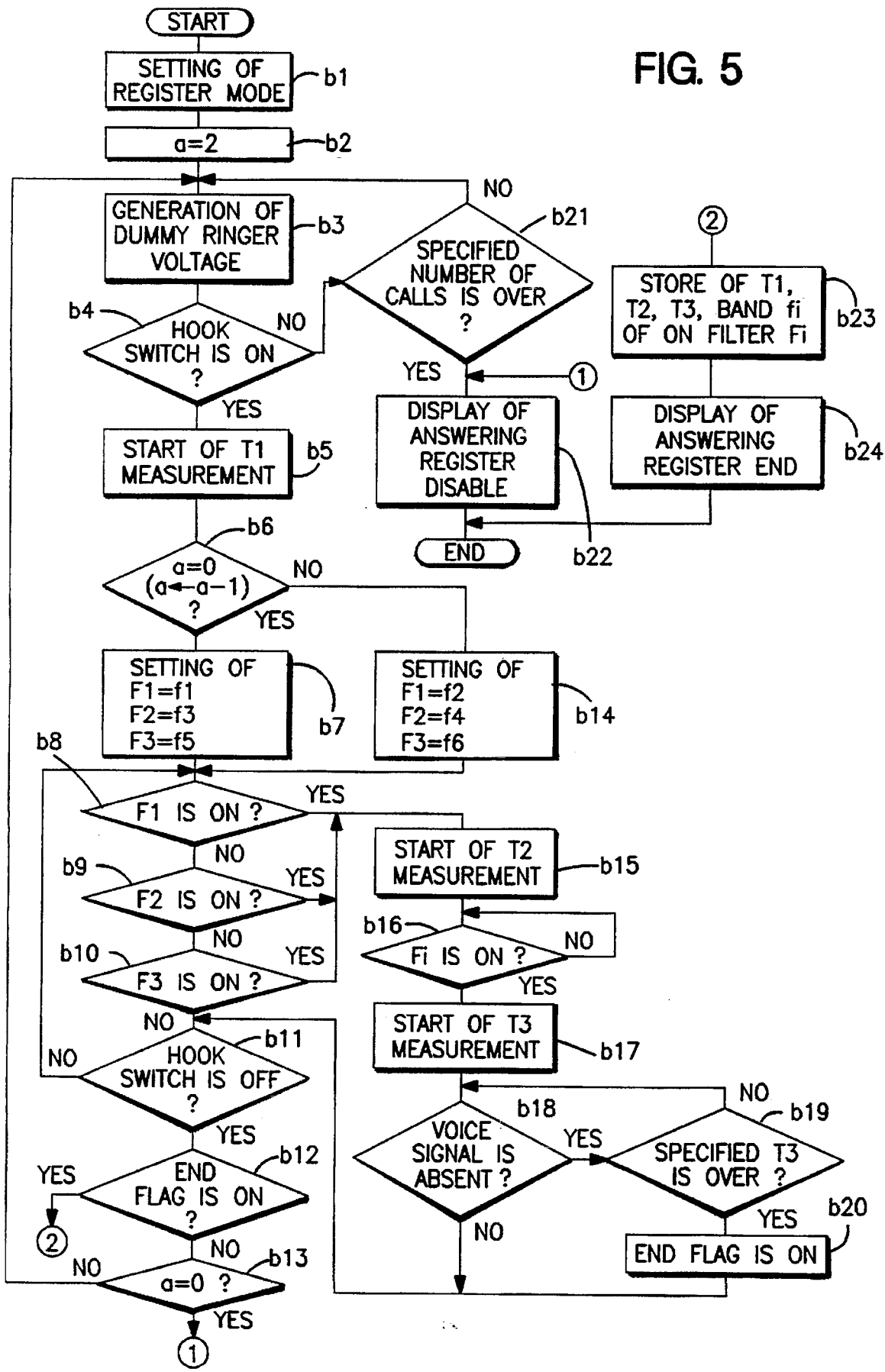
FIG. 5 is a flow chart for explaining the action in the register mode in the facsimile apparatus 1.

FIG. 5 is a flow chart showing the detection and registration action in detail. At step b1, the register mode of the facsimile apparatus 1 is set from the operation panel 5 of the facsimile apparatus 1. In succession, at step b2, the number of repetitions a=2 of the detection action is set.

At step b3, a dummy ringer voltage generated in the dummy ringer generator 17 is entered in the telephone set 31. At step b4, it is judged by the main control unit 2 if the telephone set 31 has responded to the voltage or not depending on presence or absence of the detection signal from the hook detector 16. If incoming, the operation advances to step b5, otherwise skipping to step b21.

At step b5, the hook switch is turned on, and the automatic answering telephone function of the telephone set 31 is actuated, and the send-out period T1 of the voice message is measured by the timer 7. At step b6, 1 is subtracted from the count a by the main control unit 2, and it is judged if the number of repetitions a is 0 or not. If 0, the operation advances to step b7, and if 1, to step b14.

At step b7, the bands f1, f3, f5 are set in the filters F1, F2, F3 incorporated in the modem 8, thereby advancing to step b8. At step b14, the bands f2, f4, f6 are set in the filters F1, F2, F3, thereby advancing to step b8. At step b8, it is judged if the filter F1 is turned on or not. It is turned on when the frequency band fi set in the filter F1 coincides with the frequency FP of the beep sound F, and turned off if not coinciding. The operation advances to step b9 when the filter F1 is not ON, and to step b15 if ON.

At step b9, the same judgement as in step b8 is executed on the filter F2. The operation advances to step b10 when the filter F2 is not ON, and to step b15 when ON. At step b10, the same judgement as in steps b8, b9 is executed on the filter F3. The operation advances to step b11 when the filter F3 is not ON, and to step b15 when ON.

At step b11, it is judged if the detection signal from the hook detector 16 is turned off or not. The operation advances to step b12 if OFF, and returns to step b8 otherwise. At step b12, it is judged if the detection action is over to turn on the end flag. The operation advances to step b23 if ON, and to step b13 if not ON.

At step b13, it is judged if the number of repetitions a is 0 or not. The operation advances to step b22 if 0, and returns to step b3 if 1.

At step b15, as any one of the filters F1, F2, F3 of the modem 8 is turned on, the send-out period T2 of beep sound P is measured by the timer 7. At step b16, it is checked if the "on" filter Fi of the modem 8 has been turned off or not. Herein, the subscript i is from 1 to 3. If turned off, the operation advances to step b17, and if not off, returning to step b16, the judgement is continuously repeated.

At step b17, the predetermined recording period T3 of the caller's message is measured by the timer 7. At step b18, it is judged if there is any voice signal in the recording period T3. If voice signal is not produced, the operation advances to step b19, and if voice signal is produced, it goes to step b11.

At step b19, it is judged if the predetermined recording period T3 is terminated or not. This judgement is conducted whether the hook switch is turned off or not. If terminated, advancing to step b20, and the operation returns to step b18 if not terminated. At step b20, the end flag is set and turned on, thereby moving to step b11.

At step b21, as the detection signal from the hook detector 16 at step b4 continues to be in OFF state, it is judged if the preset number n of calls is finished or not. The operation advances to step b22 if finished, and returns to step b3 if not finished. At step b22, the display telling it is impossible to register, and it is over. At step b23, the voice message send-out period T1, beep sound P send-out period T2, caller's message recording time T3, and band f1 of "on" filter Fi which have been recorded in a series of actions are recorded in the RAM 6. At step b24, the display showing the end of registration is shown.

FIG. 6 is a timing chart showing the detection and registration action. Calling is made by the dummy ringer voltage generated in the dummy ringer generator 17. At this time, the terminal 19a and terminal 19c, and terminal 19d and terminal 19f of the switch 19 are connected respectively. The switch 18 intermittently connects the terminal 18a and terminal 18c in order to send out the ringer voltage. The dummy ringer voltage is applied to send out, for example as shown in FIG. 6 (2), a ringing signal of 16 Hz for 1 second, and send out the same ringing signal again 2 seconds later. This ringing signal is sent on preset number of times n.

When called n times, the voice announcement message is sent out for period T1 from the telephone answering unit. At this time, the hook detector 16 produces a detection signal at a high level, and the terminal 13a and terminal 13b of the switch 13 are connected, and the signal from the telephone set 31 is fed into the reception amplifier 10. When the voice announcement message is completed, the beep sound P is produced for period T2, and then the caller's incoming message is recorded for period T3. After recording for period T3, the terminal 19a and terminal 19b, and terminal 19d and terminal 19e of the switch 19 are connected respectively, and the hook detector 16 produces a detection signal of low level, and further the terminal 13a and terminal 13c of the switch 13 are connected. Thus, during the period of detection and registration action, the terminal 11a of the switch 11 is connected with the terminal 11c, whereas the terminal 15a of the switch 15 is not connected to the terminal 15b.

Figure 7A:
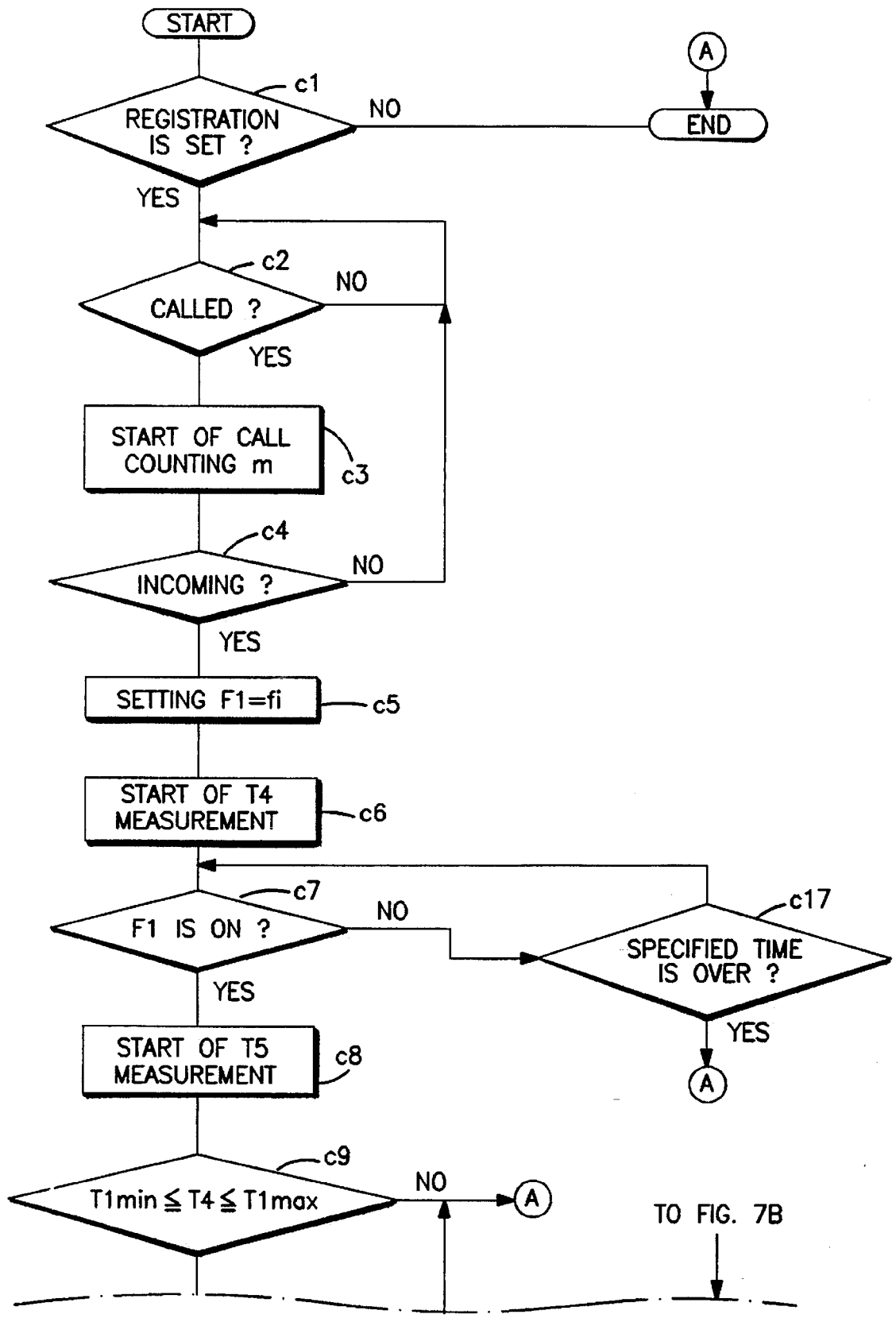
FIG. 7 is a flow chart for explaining the action of the facsimile apparatus 1.
Figure 7B:
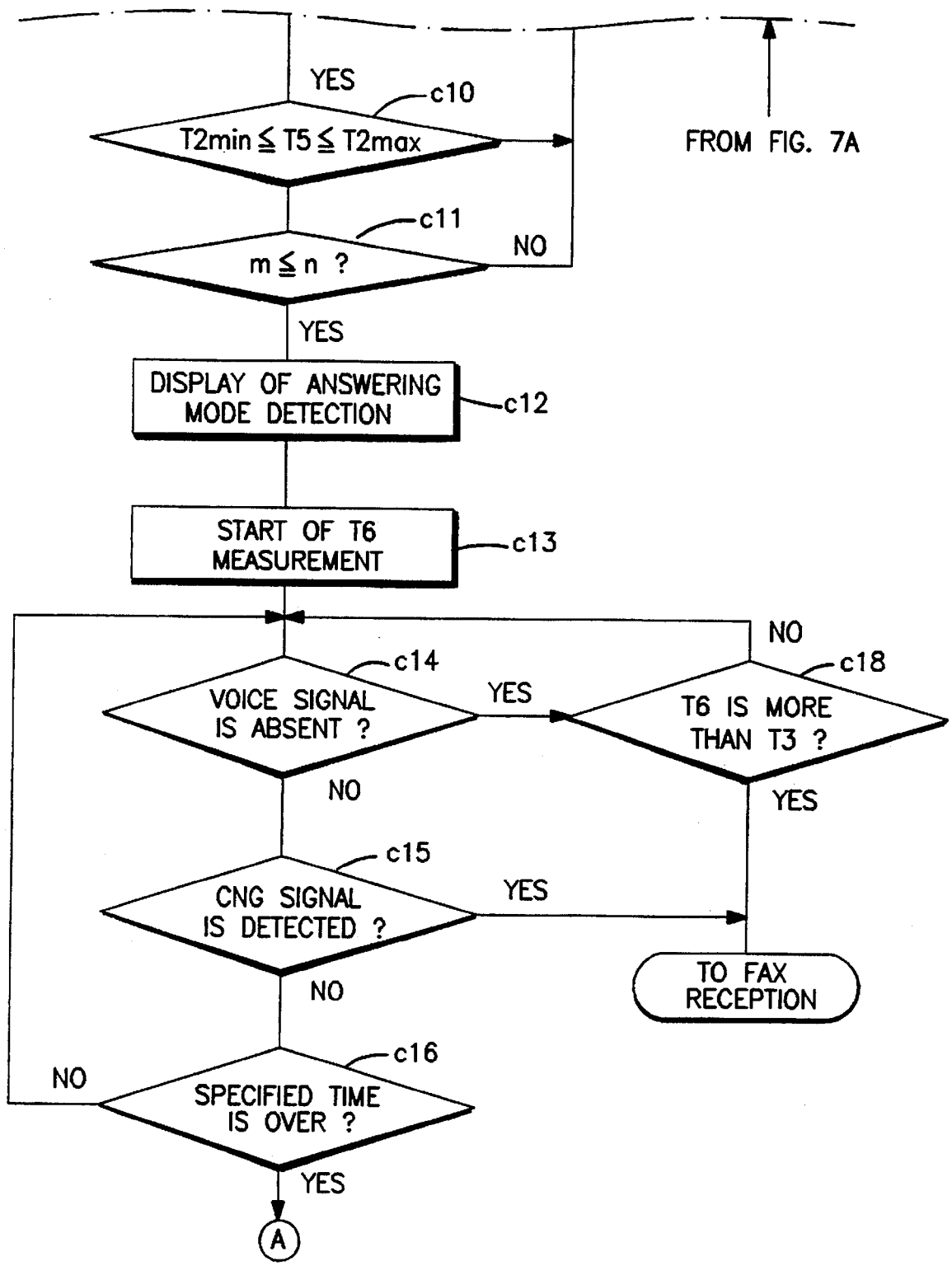

FIG. 7 is a flow chart showing the operation of the facsimile apparatus 1. The reception mode of the facsimile apparatus 1 is set in one of the three modes mentioned above. At step c1, it is judged if the registration mode is set in the facsimile apparatus 1 or not, and the operation advances to step c2 if registered, and is over if not. At step c2, it is judged if the telephone set 31 is called or not. The operation advances to step c3 if called, and returns to step c2 if not. At step c3, the number m of rings is counted by a counter in the main control unit 2. At step c4, it is judged if the telephone set 31 has responded to the call, and the operation advances to step c5 if responding, and returns to step c2 if not.

At step c5, band fi is set in filter F1 of the modem 8. At step c6, the voice message send-out period T4 is measured by the timer 7. At step c7, it is judged if the filter F1 is ON or not, and the operation advances to step c8 if ON, and to step c17 if not ON.

At step c8, simultaneously when the filter F1 is turned on, the send-out period T5 of beep sound P is measured by the timer 7. At step c9, it is judged if the period T4 satisfies the registered condition of T1min≦T4≦T1max, where T1min is the value of T1 provided with a minus allowance and T1max is the value of T1 provided with a plus allowance. When this condition is satisfied, the operation advances to step c10, and when not satisfied, the action is terminated.

At step c10, it is judged if the period T5 satisfies the registered condition of T2min≦T5≦T2max, where T2min is the value of T2 provided with a minus allowance and T2max is the value of T2 provided with a plus allowance. When this condition is satisfied, the operation advances to step c11, and when not satisfied, the action is terminated.

At step c11, it is judged if the number m of rings is within the registered number n, and if the judgement is affirmative, the operation advances to step c12, and if negative, the action is terminated. At step c12, the detection of the answering mode is displayed in the display unit not shown herein.

At step c13, the recording time T6 of the caller's message is measured by the timer 7. At step c14, it is judged if there is voice signal in period T6, and the operation skips to step c18 if absent, and goes to step c15 if present. At step c15, it is judged if a CNG signal sent out from the caller has been detected or not. If CNG is not detected, the operation advances to step c16, and if CNG is detected, changeover to facsimile reception is executed. At step c16, it is judged if the specified time, that is, the predetermined time for judging the voice signal or CNG signal, is over or not, and the action is terminated if over, and returns to step c14 if not over.

At step c17, as the filter F1 is not ON, it is judged if the predetermined specified time is over or not. The action is terminated if over, and returns to step c7 if not over. At step c18, as there is no voice signal at step c14, it is judged if the measured recording period T6 is over the preset recording period T3 or not. The connection is changed over to the facsimile reception if exceeding the period T3, and the operation returns to step c14 if not.

FIG. 8 is a timing chart during operation of the facsimile apparatus 1. During operation of the facsimile apparatus 1, the terminal 19a and terminal 19d of the switch 19 are connected to the terminal 19b and terminal 19e, respectively, and the terminal 18a of the switch 18 is connected to the terminal 18b. The detection signal from the hook detector 16 is low level. The terminal 13a of the switch 13 is connected to the terminal 13c, and the terminal 11a of the switch 11 is connected to the terminal 11c. The terminal 15a of the network changeover switch 15 is not connected to the terminal 15b.

When calling is executed, the incoming detector 22 is turned on. When the telephone set 31 responds to the call, the polarity inversion detector 21 is turned on, and the voice message is sent out for the period T4, and the beep sound P is sent out for the period T5. After the beep sound P, the caller's message is recorded for the period T6, and then the terminal 11a of the switch 11 is connected to the terminal 11b, and the terminal 15a of the network changeover switch 15 is connected to the terminal 15b, thereby changing over to the facsimile reception. Afterwards, a CED signal and DIS (NSF, CSI) signal are sent out.

Thus, according to the embodiment, when the operator sets the automatic answering telephone set in the answering record mode, he is liberated from the trouble of also setting the facsimile to the answering telephone connection mode. Moreover, the problem of unexpected change to the facsimile apparatus during telephone service is solved. If the manual reception mode is set at the facsimile, after the automatic answering telephone function is actuated to record the caller's voice message, the no-signal detection function preset in the facsimile apparatus 1 changes the connection of the public telephone network to the facsimile so as to be ready for facsimile reception. Hence, it is not necessary to change over the mode setting, and the controllability and convenience are enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communications system connected to a telephone network comprising:

a facsimile machine;

a telephone set including a telephone for conducting voice communications over the telephone network and a telephone answering machine for automatically responding to calls received by the telephone set over the telephone network, said answering machine having at least one operational parameter relating to automatic response to the calls;

a switch for connecting either the facsimile machine or the telephone set to the telephone network;

an activation unit for activating the answering machine to permit initial detection of the at least one operational parameter;

a memory for storing the initially detected parameter; and a controller for controlling the switch to connect one of the facsimile machine and the telephone set to the telephone network based on a comparison of the initially detected operational parameter of the answering machine stored in the memory and a response of the answering machine to a received call, wherein the at least one operational parameter is a period of time during which the answering machine generates an announcement message after responding to the call.

2. A communications system connected to a telephone network comprising:

a facsimile machine;

a telephone set including a telephone for conducting voice communications over the telephone network and a telephone answering machine for automatically responding to calls received by the telephone set over the telephone network, said answering machine having at least one operational parameter relating to automatic response to the calls;

a switch for connecting either the facsimile machine or the telephone set to the telephone network;

an activation unit for activating the answering machine to permit initial detection of the at least one operational parameter;

a memory for storing the initially detected parameter; and a controller for controlling the switch to connect one of the facsimile machine and the telephone set to the telephone network based on a comparison of the initially detected operational parameter of the answering machine stored in the memory and a response of the answering machine to a received call, wherein the at least one operational parameter is a frequency of a tone produced by the answering machine after responding to the call indicating that a caller may leave a message after the tone.

3. The method in claim 2, wherein the at least one operational parameter is a period to time during which the caller may leave the message.

4. The method in claim 2, wherein the at least one operational parameter is a period of time during which the tone is produced.

5. A communications system connected to a telephone network comprising:

a facsimile machine set to an automatic reception mode for automatically responding to calls received by the communications system over the telephone network;

a telephone set having a telephone handset and a telephone answering function for automatically responding to calls received by the communications system over the telephone network;

a switch for connecting either the facsimile machine or the telephone set to the telephone network, the switch initially connecting the telephone set to the telephone network; and a controller for controlling the switch, (A) when the telephone answering function is activated, to connect the facsimile machine to the telephone network if (1) a message from a caller making a call is not detected within a predetermined period of time after the telephone answering function responds to the call or (2) a facsimile control signal is received along with the call and, (B) when the telephone answering function is deactivated when a user takes the telephone handset off-hook, to maintain connection of the telephone set to the telephone network.

6. A method for operating a facsimile apparatus that receives calls over a telephone line including a facsimile machine, a telephone set having a handset and an automatic answering machine, and a switch for controllably connecting either of the facsimile machine or the telephone set to the telephone line, comprising the steps of:

(a) detecting an operational parameter of the automatic answering machine;

(b) storing the detected parameter;

(c) receiving a call over the telephone line;

(d) comparing a response of the automatic answering machine to the received call to the stored parameter; and (e) controlling the facsimile apparatus based on the comparing step, wherein the stored parameter is a period of time during which the answering machine generates an announcement message after responding to the call.

7. A method for operating a facsimile apparatus that receives calls over a telephone line including a facsimile machine, a telephone set having a handset and an automatic answering machine, and a switch for controllably connecting either of the facsimile machine or the telephone set to the telephone line, comprising the steps of:

(a) detecting an operational parameter of the automatic answering machine;

(b) storing the detected parameter;

(c) receiving a call over the telephone line;

(d) comparing a response of the automatic answering machine to the received call to the stored parameter; and (e) controlling the facsimile apparatus based on the comparing step, wherein the stored parameter is a frequency of a tone produced by the answering machine after responding to the call indicating that a caller may leave a message after the tone.

8. The method in claim 7, wherein the stored parameter is a period to time during which the caller may leave the message.

9. The method in claim 7, wherein the stored parameter is a period of time during which the tone is produced.

* * * * *